(12) United States Patent
Isozaki

(10) Patent No.: US 8,983,892 B2
(45) Date of Patent: Mar. 17, 2015

(54) INFORMATION PROCESSING APPARATUS, INFORMATION PROCESSING METHOD, AND PROGRAM

(75) Inventor: Takashi Isozaki, Kanagawa (JP)

(73) Assignee: Sony Corporation (JP)

( * ) Notice: Subject to any disclaimer, the term of this patent is extended or adjusted under 35 U.S.C. 154(b) by 377 days.

(21) Appl. No.: 13/463,935

(22) Filed: May 4, 2012

(65) Prior Publication Data

US 2012/0303572 A1    Nov. 29, 2012

(30) Foreign Application Priority Data

May 24, 2011   (JP) ................................. 2011-115925

(51) Int. Cl.
  *G06N 7/02*   (2006.01)
  *G06K 9/62*   (2006.01)
  *G06N 7/00*   (2006.01)

(52) U.S. Cl.
  CPC ............ *G06K 9/6277* (2013.01); *G06N 7/00* (2013.01)
  USPC ...................................................... 706/52

(58) Field of Classification Search
  None
  See application file for complete search history.

(56) References Cited

U.S. PATENT DOCUMENTS

| | | | |
|---|---|---|---|
| 6,892,164 B2* | 5/2005 | Takeuchi et al. ............... | 702/181 |
| 7,636,651 B2* | 12/2009 | Bishop et al. ..................... | 703/2 |
| 8,010,476 B2* | 8/2011 | Fung et al. ...................... | 706/46 |
| 2002/0107853 A1* | 8/2002 | Hofmann et al. ................ | 707/7 |
| 2005/0181386 A1* | 8/2005 | Diamond et al. ................ | 435/6 |
| 2008/0301077 A1* | 12/2008 | Fung et al. ...................... | 706/46 |
| 2010/0030534 A1* | 2/2010 | Reich et al. ...................... | 703/2 |
| 2011/0069896 A1* | 3/2011 | Ishiga ........................... | 382/224 |
| 2012/0078821 A1* | 3/2012 | Ma et al. ......................... | 706/12 |
| 2012/0303572 A1* | 11/2012 | Isozaki .............................. | 706/52 |
| 2013/0138428 A1* | 5/2013 | Chandramouli et al. ......... | 704/9 |
| 2013/0257873 A1* | 10/2013 | Isozaki ........................... | 345/440 |

FOREIGN PATENT DOCUMENTS

JP   2008-299524 A   12/2008

OTHER PUBLICATIONS

Takashi Isozaki, "Learning Bayesian Networks using Minimum Free Energuy Principle", Mar. 2010, pp. 1-114.*
Harald Steck, "Learning the Bayesian Network Structure: Dirichlet Prior versus Data", Proceedings of Conference on Uncertainity in Artificial Intelligence, pp. 511-518, 2008.
Takashi Isozaki, Noriji Kato, Maomi Ueno, "Data Temperature" in Minimum Free Energies for Parameter Learning of Bayesian Networks. International Journal on Artificial Intelligence Tools. vol. 18, No. 5 (Sep. 14, 2009) pp. 653-671. © World Scientific Publishing Company.

(Continued)

*Primary Examiner* — Jeffrey A Gaffin
*Assistant Examiner* — Paulinho E Smith
(74) *Attorney, Agent, or Firm* — Lerner, David, Littenberg, Krumholz & Mentlik, LLP

(57) ABSTRACT

A probability function with highest likelihood is calculated based on data. A canonical distribution in statistical physics and a temperature parameter of the canonical distribution are calculated as a fluctuation of the data. A probability function is estimated using the calculated probability function with the highest likelihood, the calculated fluctuation, and the canonical distribution. The present technology is applicable to an apparatus that estimates and uses a probability function.

17 Claims, 4 Drawing Sheets

(56) References Cited

OTHER PUBLICATIONS

Shulin Yang and Kuo-Chu Chang, "Comparison of Score Metrics for Bayesian Network Learning", IEEE Transactions on Systems, Man and Cybernetics—Part A: Systems and Humans, vol. 32, No. 3, May 2002, pp. 419-428.

Tomi Silander, Petri Kontkanen and Petri Myllymaki, "On Sensitivity of the MAP Bayesian Network Structure to the Equivalent Sample Size Parameter", Proceedings of Conference on Uncertainity in Artificial Intelligence, pp. 360-367, 2007.

* cited by examiner

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2011-115925 filed in the Japanese Patent Office on May 24, 2011, the entire content of which is incorporated herein by reference.

BACKGROUND

The present technology relates to an information processing apparatus, an information processing method, and a program, and more particularly, to an information processing apparatus, an information processing method, and a program capable of estimating an optimum probability function without setting parameters or the like when a probability function is estimated based on data.

There is a known technology of classifying data obtained subsequently by the use of a classification rule obtained by learning preliminarily given data. In such a technology, a true probability distribution or a probability distribution close to the true probability distribution of a data generation source behind data is estimated. To estimate the probability distribution, many models such as the mixture Gaussian distribution, the hidden Markov model, and the Bayesian network have been studied.

SUMMARY

In a statistics text of Liberal Arts College of Tokyo University, "Scientific Statistics" by University of Tokyo Press, 1992, a probability function is calculated from a relative frequency when the probability function is estimated based on data. In this method, however, over-learning occurs when the amount of data is small. Therefore, it has been apparent that this estimation is not robust estimation from abundant experiments.

In "The Bayesian Choice: From Decision-Theoretic Foundations to Computational Implementation" by C. P. Robert, Springer-Verlag, New York, N.Y., second edition, 2007, Bayesian statistics using a prior distribution in which a prior belief (also referred to as a prior frequency or a virtual frequency) of an analyzer, which is not data, is added to a frequency is disclosed. According to this method, over-learning may be avoided. However, when the analyzer has no prior knowledge or it is necessary to make an objective analysis, it is difficult to quantitatively set an objective prior belief or an objective prior frequency.

In "Comparison of Score Metrics for Bayesian Network Learning" by S. Yang and K. C. Chang, IEEE Transactions on Systems, Man, and Cybernetics Part A, Systems and Humans, Vol. 32, No. 3, pp. 419 to 428, 2002, a method of recommending a specific value in terms of inference of a multivariable Bayesian network structure is disclosed. However, there is no theoretical basis for the value recommended in "Comparison of Score Metrics for Bayesian Network Learning" by S. Yang and K. C. Chang, IEEE Transactions on Systems, Man, and Cybernetics Part A, Systems and Humans, Vol. 32, No. 3, pp. 419 to 428, 2002. Further, since various sets of data are not sufficiently examined, optimality is not yet clear.

In these parameters, there is theoretical unconformity in a case of a multivariable. For this reason, another parameter called an equivalent sample size (ESS) is recommended. According to "On sensitivity of the map Bayesian network structure to the equivalent sample size parameter" by T. Silander P. Kontkane, and P. Myllymaki, Proceedings of Conference on Uncertainty in Artificial Intelligence, pp. 360 to 367, 2007, the optimum value of the parameter is considerably varied for each set of data and optimization is difficult. This optimization method is suggested in "Learning the Bayesian network structure: Dirichlet prior versus data" by H. Steck, Proceedings of Conference on Uncertainty in Artificial Intelligence, pp. 511 to 518, 2008. "Learning the Bayesian network structure: Dirichlet prior versus data" by H. Steck, Proceedings of Conference on Uncertainty in Artificial Intelligence, pp. 511 to 518, 2008, combines a method of Bayesian statistics called BDeu and a method of non-Bayesian statistics called AIC, and thus lacks theoretical coherence. However, it is difficult to perform the optimum estimation by the use of the small amount of data, since the accuracy deteriorates due to the small amount of data. Further, since this method specializes is estimation of a multivariable network structure and thus may not be used for estimation of a general probability function, this method is not generally used.

In Japanese Unexamined Patent Application Publication No. 2008-299524 and ""Data Temperature" in Minimum Free Energies for Parameter Learning of Bayesian networks" by T. Isozaki, N. Nato, and M. Ueno, International Journal on Artificial Intelligence Tools, Vol. 18, No. 5, pp 653 to 671, 2009, a method of estimating a probability by the use of a free energy minimization principle is disclosed. This method is known as a method which is more robust than maximum likelihood estimation such as Bayesian estimation. However, since a temperature is set on the assumption of a function that is positively dependent on the amount of data, the optimization is not achieved. Further, since there is a parameter that makes optimum determination difficult, this method is similar to Bayesian statistics.

It is desirable to provide a technology of estimating an optimum probability function in terms of free energy minimization without setting a parameter or the like when a probability function is estimated based on data.

According to an embodiment of the present technology, there is provided an information processing apparatus including: a first calculation unit that calculates a probability function with highest likelihood based on data; a second calculation unit that calculates a canonical distribution in statistical physics and a parameter of the canonical distribution as a fluctuation of the data; and an estimation unit that estimates a probability function using the probability function with the highest likelihood calculated by the first calculation unit, the fluctuation calculated by the second calculation unit, and the canonical distribution.

The first calculation unit may calculate an empirical distribution function.

The probability function with the highest likelihood may be substituted with a Bayesian posterior probability function.

The second calculation unit calculates the fluctuation of the data as a parameter corresponding to the temperature of the canonical distribution. The fluctuation of the data may be calculated using at least one of the probability function with the highest likelihood, an empirical distribution function, a Bayesian posterior probability function, and the estimated probability function.

The fluctuation of the data may not include another parameter set in advance or a parameter calculated for each set of data.

The second calculation unit may calculate the fluctuation of the data using Kullback-Leibler information.

When the second calculation unit calculates the fluctuation of the data, n data items may be used, and Kullback-Leibler information may be calculated by the probability function calculated based on (n−1) data items by the estimation unit and one of a probability function with the highest likelihood calculated based on the n data items, a Bayesian posterior probability function, and an empirical distribution function.

The probability function calculated based on the (n−1) data items may be substituted with a geometric mean of the probability function calculated likewise based on up to j (where $0 \leq j \leq n-1$) data items. When j=0, a uniform distribution function may be used.

One of the probability function with the highest likelihood calculated based on the n data items, the Bayesian posterior probability function, and the empirical distribution function may be substituted with a geometric mean of one of a probability function having the highest likelihood calculated likewise based on up to j (where $0 \leq j \leq n-1$) data items, the Bayesian posterior probability function, and the empirical distribution function.

The probability function may be estimated by the use of recursive calculation performed using the canonical distribution and the fluctuation of the data calculated by substitution of the probability function calculated based on (n−1) data items by a probability function calculated based on n data items.

A statistical hypothesis test may be performed using the probability function estimated by the estimation unit.

One of a mutual information amount, a G-squared statistic, and a probability function ratio calculated from the probability function estimated by the estimation unit may be used.

A chi-squared statistic calculated from the probability function estimated by the estimation unit may be used.

A statistical model may be selected using the probability function estimated by the estimation unit.

A model with least entropy calculated from the probability function estimated by the estimation unit may be selected.

The probability function estimated by the estimation unit may be a multivariate joint probability function or a conditional probability function.

The information processing apparatus may be a causal detection apparatus detecting statistical cause and effect or a classifier.

The multivariate probability function may be one of a Bayesian network, a causal Bayesian network, a Markov network, and a Markov logic network.

According to another aspect of the present technology, there is provided an information processing method including: calculating a probability function with highest likelihood based on data; calculating a canonical distribution in statistical physics and a parameter of the canonical distribution as a fluctuation of the data; and estimating a probability function using the probability function with the highest likelihood, the fluctuation of the data, and the canonical distribution.

According to still another aspect of the present technology, there is provided a program for causing a computer to execute a process that includes: calculating a probability function with highest likelihood based on data; calculating a canonical distribution in statistical physics and a parameter of the canonical distribution as a fluctuation of the data; and estimating a probability function using the probability function with the highest likelihood, the fluctuation of the data, and the canonical distribution.

According to the aspects of the present technology, a probability function with highest likelihood is calculated based on data; a canonical distribution in statistical physics and a parameter of the canonical distribution are calculated as a fluctuation of the data; and a probability function is estimated using the probability function with the highest likelihood, the fluctuation of the data, and the canonical distribution.

According to the embodiments of the present technology, it is possible to estimate an optimum probability function without setting a parameter or the like when a probability function is estimated based on the data.

DETAILED DESCRIPTION OF THE EMBODIMENTS

Figure 1:
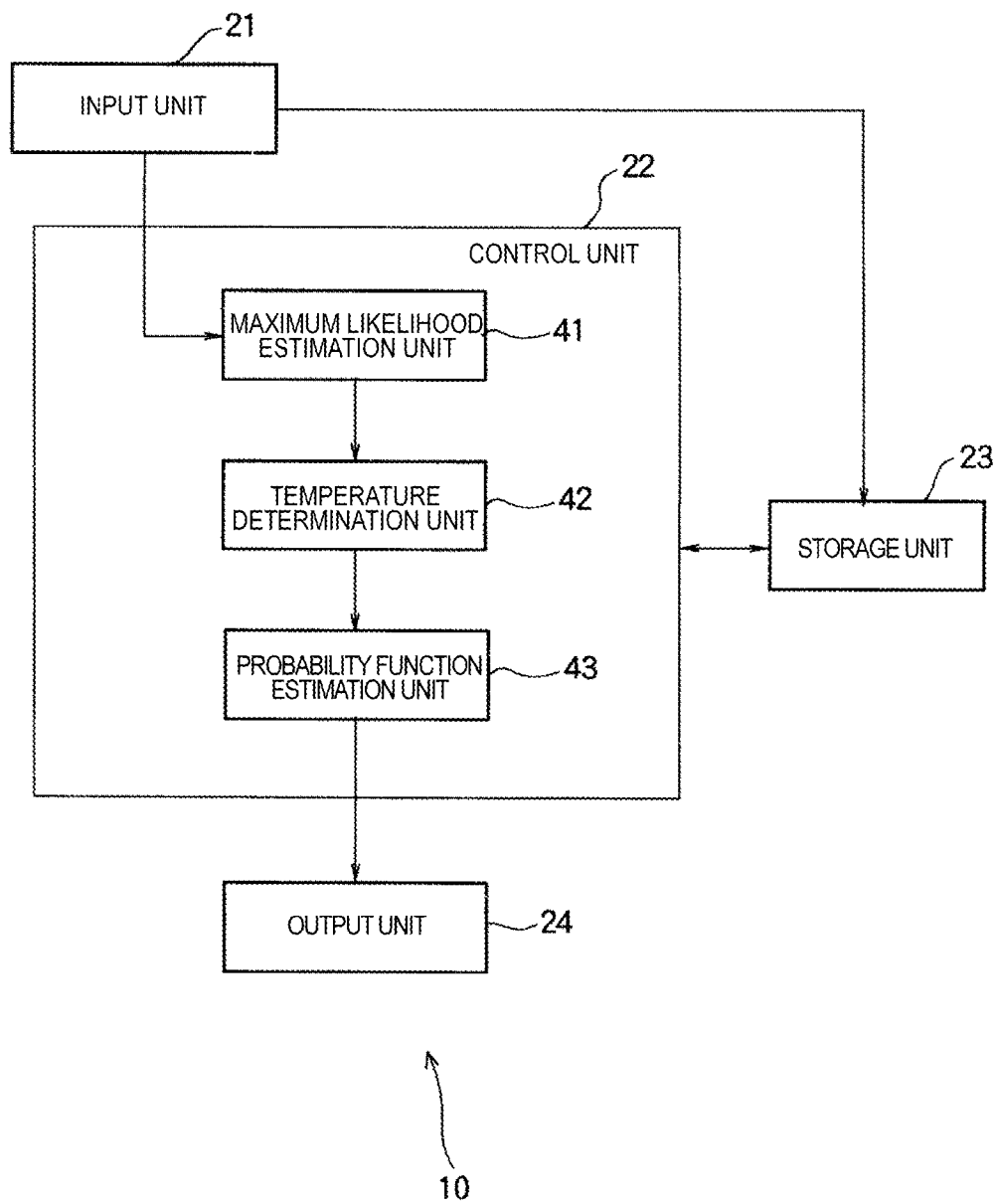
FIG. 1 is a diagram illustrating an information processing apparatus that estimates a probability function according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Configuration of Information Processing Apparatus

FIG. 1 is a diagram illustrating the configuration of an information processing apparatus according to an embodiment of the present technology. An information processing apparatus 10 shown in FIG. 1 includes an input unit 21, a control unit 22, a storage unit 23, and an output unit 24. The control unit 22 includes a maximum likelihood estimation unit 41, a temperature determination unit 42, and a probability function estimation unit 43. Here, a case of N predetermined discrete random variables will be described, but it is assumed that a case of N=1 is also included.

The control unit 22 is a program control device such as a central processing unit (CPU) and operates in accordance with a program stored in the storage unit 23. The N discrete random variables and the inner state of each of the discrete random variables are stored in the storage unit 23. Further, data is stored as a database in the storage unit 23.

A parameter for designating a probability function of the random variable to be calculated is input into the input unit 21. Alternatively, m data near the data in the database are used, or detailed information regarding data to be used may be input as a parameter. The probability function can designate a joint probability function including a plurality of variables or a conditional probability function. The input unit 21 outputs the input information to the control unit 22.

When a discrete probability variable is expressed as $\{X_i\}$ (i=1, ..., n), a probability of an inner state j of a predetermined variable $X_i$ is described here to $P(X_i=j)$. When the joint probability function has two variables, the probability may be described as $P(X_i=k, X_j=l)$. Further, when the conditional probability function has two variables, the probability may be described as $P(X_i=l|X_j=m, X_k=q)$.

Based on an input into the input unit 21, a probability function or a probability value to be estimated is proved. Next, based on this information, the maximum likelihood estimation unit 41 calculates a corresponding frequency from the database stored in the storage unit 23 and calculates a probability function or a probability value subjected to maximum likelihood estimation. Next, the temperature determination unit 42 integrates the maximum likelihood information and information from the database and determines a temperature. Based on this information, the probability function estimation unit 43 calculates the final probability function or the final probability value and the output unit 24 outputs the calculation result to the outside.

In the embodiment of the present technology, since there is no undetermined parameter, a user need not adjust and set the parameters. Therefore, the burden on the user can be reduced. Further, more robust estimation can be realized compared to a maximum likelihood estimator. According to the embodiment of the present technology, such a compatibility advantage can be obtained. Hereinafter, more specific description will be made.

First Embodiment

A process performed by the information processing apparatus 10 shown in FIG. 1 will be described in an example of estimation of a probability function with one variable according to a first embodiment.

First, the storage unit 23 stores {x} as one of the probability variables and also stores three inner states of the probability variable. It is assumed that ten cases of the data for the probability variable are input into the input unit 21. The cases can be stored in the storage unit 23. The inner state refers to, for example, a high, intermediate, or low state. As the states, the high state occurs four times, the intermediate state occurs three times, and the low state occurs three times. This information is input into the input unit 21 and is stored in the storage unit 23.

Next, the maximum likelihood estimation unit 41 can enumerate a frequency ni of each state $X_i$ (where i=1, 2, and 3) with reference to the cases input for every three states. Next, a relative frequency, that is, a probability function, can be calculated using the number of data n=10 by Equation (1) below through maximum likelihood estimation.

[Equation 1]

$$\hat{P}n(Xi) = \frac{ni}{n} \quad (1)$$

In Equation 1, $$\hat{P} \quad \text{[Equation 2]}$$

$\hat{P}$ is described as P hat below. The maximum likelihood estimation unit 41 performs calculation based on the probability function P hat expressed in Equation (1) by the use of the above-described information stored in the storage unit 23.

Next, the temperature determination unit 42 quantifies a fluctuation of data. Hereinafter, the fluctuation of the data is referred to as a temperature. The state where the temperature is high refers to a state where the fluctuation of the data is large. The state where the temperature is low refers to a state where the fluctuation of the data is small. When the number of data is small, an estimated function is likely not to be suitable. However, as described later, the concept of the temperature is introduced. Therefore, even when the number of data is small, it is possible to make an estimated function suitable.

A geometric mean is defined as in Equation (2) using a probability function $P_j(X)$ estimated based on j data items satisfying "n>j" among n data items.

[Equation 3]

$$P_{n-1}^G(X) = \left[\prod_{j=0}^{n-1} Pj(X)\right]^{1/n} \quad (2)$$

Here, the probability function is defined as $P_0(X_i)=1/|X|$. |X| indicates the number of inner states of a variable X. Therefore, $P_0(X)$ is a uniform probability function. Here, since |X| is equal to 3, $P_0(X_i)$ is equal to ⅓ without dependency on the state i. A temperature T for the number of data n (where n≥1), Equation (3) below is defined using Equation (1) and Equation (2).

[Equation 4]

$$T = \sum_{Xk} P_{n-1}^G(Xk) \log \frac{P_{n-1}^G(Xk)}{\hat{P}_n(Xk)} \quad (3)$$

In Equation (3), the right side of the temperature T is defined with the Kullback-Leibler information. Therefore, "T≥0" is satisfied by the property of the Kullback-Leibler information. Further, when n≥1, β is defined as in Equation (4).

$$\beta = 1/(1+T) \quad (4)$$

The temperature T is converted into an amount β defined in Equation (4). When n=0, β is defined as 0.

Next, the probability function estimation unit 43 estimates a probability function when n≥1. Here, an estimation result $P(X_i)$ can be obtained using a canonical distribution expressed in Equation (5) below derived by the use of the free energy minimum principle.

[Equation 5]

$$Pn(Xi) = \frac{\exp(\beta \log \hat{P}n(Xi))}{\sum_{Xi} \exp(\beta \log \hat{P}n(Xi))} \quad (5)$$

In Equation (5), the estimation result is $P_0(X_i)=1/|X|$, when n=0. The estimated function is output as the estimation result to the output unit 24 and is supplied to a process at the rear stage (not shown).

The maximum likelihood estimation unit 41 calculates the probability function with the highest likelihood based on available data. The temperature determination unit 42 calculates a canonical distribution in statistical physics and a parameter of the canonical distribution as a fluctuation of data. The probability function estimation unit 43 estimates the probability function using the probability function with the highest likelihood, the calculated fluctuation, and the canonical distribution. Thus, a maximum likelihood estimator can automatically be corrected by calculating the fluctuation of the data as the parameter of the canonical distribution.

The maximum likelihood estimation unit 41 may be configured to calculate an empirical distribution function based on the available data. Further, the maximum likelihood estimation unit 41 calculates the empirical distribution function based on the available data. The temperature determination unit 42 may be configured to calculate a canonical distribution in statistical physics and a parameter of the canonical distribution as fluctuation of data. The probability function estimation unit 43 may be configured to estimate a probability function estimated by the use of the canonical distribution. With such a configuration, estimation in which the empirical distribution is automatically estimated can be performed by calculating the fluctuation of the data as the parameter of the canonical distribution.

Further, the maximum likelihood estimation unit 41 may be configured to calculate a probability function of the highest likelihood or to calculate a Bayesian posterior probability function. When the Bayesian posterior probability function is calculated, prior knowledge may be reflected.

When the temperature determination unit 42 calculates the temperature (calculates the fluctuation of the data), the temperature determination unit 42 calculates the temperature as a parameter corresponding to the temperature of the canonical distribution. The fluctuation of the data may be calculated using at least one of the probability function with the highest likelihood, the empirical distribution function, the Bayesian posterior probability function, or the estimated probability function. Thus, the parameter can be calculated specifically based on the fluctuation of the data.

When the temperature determination unit 42 calculates the fluctuation (temperature) of the data, the calculation is performed without including another parameter set in advance or a parameter calculated for each set of data. Therefore, the probability function can be well estimated simply and accurately without an unnecessary burden on the user since the user need not set the parameter.

When the temperature determination unit 42 calculates the fluctuation of the data, the fluctuation of the data is calculated using the Kullback-Leibler information. When the Kullback-Leibler information is used, the fluctuation can be restricted to the amount equal to or greater than 0. Therefore, the probability function can be estimated with high accuracy when used together with the canonical distribution.

When the temperature determination unit 42 calculates the fluctuation of the data, n data items are used, and thus the Kullback-Leibler information may be calculated by a probability function which is calculated based on the n data items and has the highest likelihood, the Bayesian posterior probability function, or the empirical distribution function and a probability function calculated based on (n−1) data items. In this configuration, Equation (3) above is changed to Equation (6) below.

[Equation 6]

$$T = \sum_{Xk} P_{n-1}^{G}(Xk) \log \frac{P_{n-1}(Xk)}{\hat{P}_{n}(Xk)} \quad (6)$$

In the equation, a difference between the estimation and the estimation performed based on the immediately previous data can be specifically calculated as a fluctuation.

When the temperature determination unit 42 calculates the fluctuation of the data, n data items are used as in Equation (3) above. Therefore, the probability function which is calculated based on the n data items and has the highest likelihood, the Bayesian posterior probability function, or the empirical distribution function and a probability calculated based on (n−1) data items may be calculated by the geometric mean of a probability function calculated likewise based on up to j (one in the range of 0≤j≤n−1) data items. At this time, when j=0, a uniform distribution function can be used. Thus, a deviation from the mean obtained based on the previous data can be specifically calculated as a fluctuation.

When the temperature determination unit 42 calculates the fluctuation of the data, the probability function which is calculated based on the n data items and has the highest likelihood, the Bayesian posterior probability function, or the empirical distribution function may be calculated by the geometric mean of a probability function calculated likewise based on up to j (one in the range of 0≤j≤n−1) data items, the Bayesian posterior probability function, or the empirical distribution function. In this configuration, Equation (3) above is changed to Equation (7) below.

[Equation 7]

$$T = \sum_{Xk} P_{n-1}^{G}(Xk) \log \frac{P_{n-1}^{G}(Xk)}{\hat{P}_{n}^{G}(Xk)} \quad (7)$$

Thus, a deviation from the mean obtained based on the previous data can be specifically calculated as a fluctuation.

When the temperature determination unit 42 calculates the fluctuation of the data, the probability function can be estimated by the use of recursive calculation performed using the fluctuation by substitution of the probability function calculated based on (n−1) data items by a probability function calculated based on n data items and the canonical distribution. Thus, when the recursive calculation is used, the amount of calculation may increase, but the accuracy can be improved.

Second Embodiment

Since the first embodiment can be easily extended to a case of a conditional probability and a joint probability of two or more variables, the conditional probability and the joint probability of two or more variables will be described below according to a second embodiment. The joint probability can be analyzed and expressed to a product of the conditional probability and the following:

$$P(X_i, X_2, \ldots, X_n) = P(X_n | X_{n-1}, \ldots, X_2, X_1) \ldots P(X_2 | X_1) P(X_1).$$

Therefore, only the conditional probability may be considered.

In the case of the conditional probability, when the conditional probability for a given pair of variables {Y, Z} of a variable {X} is exemplified, the probability of the independent variable {X} is only estimated for all of the specific states {Y=y, Z=z} among the conditions. When j is formed by attaching an index to a specific state of the conditional variables {Y, Z}, the condition probability function P hat (X|Y, Z) subjected to the maximum likelihood estimation is obtained as Equation (8) below, as in Equation (1) on the assumption that nj is the amount of data satisfying the condition that the state of {Y, Z} is j, i is an index of each state of the variable {X}, and nij is a frequency of the data in which X=i.

[Equation 8]

$$\hat{P}(X = i | \{Y, Z\} = j) = \frac{nij}{nj} \quad (8)$$

Equation (9) below is obtained as in Equation (2).

[Equation 9]

$$P^G_{nj-1}(X \mid Y, Z) = \left[\prod_{m=0}^{nj-1} Pm(X \mid Y, Z)\right]^{1/nj} \quad (9)$$

When an index j is attached to Equation (3), Equation (10) below is obtained.

[Equation 10]

$$Tj = \sum_x P^G_{nj-1}(X \mid \{Y, Z\} = j) \log \frac{P^G_{nj-1}(X \mid \{Y, Z\} = j)}{\widehat{P}_{nj}(X \mid Y, Z) = j} \quad (10)$$

In Equation (4), the temperature is $\beta_j$ defined. Equation (5) of the normal distribution is calculated to Equation (11) below.

[Equation 11]

$$Pnj(Xi \mid \{Y, Z\} = j) = \frac{\exp(\beta j \log \widehat{P}nj(Xi \mid \{Y, Z\} = j))}{\sum_{Xi} \exp(\beta j \log \widehat{P}nj(Xi \mid Y, Z\} = j))} \quad (11)$$

Alternatively, when a mean is calculated even for j in regard to the temperature $T_j$ and the mean is set to T, Equation (12) below is expressed.

[Equation 12]

$$T = \sum_{X,y,z} P^G_{nj-1}(x, y, z) \log \frac{P^G_{nj-1}(x \mid y, z)}{\widehat{P}_{nj}(x \mid y, z)} \quad (12)$$

$\beta$ calculated from T in Equation (4) may be used instead of $\beta_j$ in Equation (11).

Third Embodiment

Next, a case of a conditional independent test of three variables by the use of a $G^2$ statistic will be described according to a third embodiment. An information processing apparatus performing the conditional independent test of three variables has a configuration shown in FIG. 2. An information processing apparatus 100 shown in FIG. 2 includes an input unit 121, a control unit 122, a storage unit 123, and an output unit 124. The control unit 122 includes a maximum likelihood estimation unit 141, a temperature determination unit 142, a probability function estimation unit 143, a statistic calculation unit 144, a threshold value determination unit 145, and an independence determination unit 146.

A process of the information processing apparatus 100 will be described. The storage unit 123 stores probability variables {X, Y, Z} and also stores three inner states thereof. Further, the storage unit 123 stores ten previous cases for the variables as a database.

It is assumed that an instruction to perform a conditional independent test under the condition of Z of X and Y in {X, Y, Z} is input to the input unit 121. However, the conditional variable Z also includes a case of a null set. In this case, this test is an independent test of X and Y. When the $G^2$ statistic is expressed to $G^2$, a relation with a mutual information amount I(X;Y) in the information theory is a relation of Equation (13) below on the assumption that N is the number of data.

[Equation 13]

$$G^2 = 2NI(X; Y \mid Z) = 2N \sum_{x,y,z} \widehat{P}(x, y, z) \log \frac{\widehat{P}(x \mid y, z)}{\widehat{P}(x \mid z)} \quad (13)$$

In this equation, P hat represents a maximum likelihood estimator. The maximum likelihood estimator P hat in the $G^2$ statistic or the mutual information amount I(X;Y) is substituted with an estimated probability function P. For example, the method described in the first or second embodiment described above can be used as an estimation method. That is, the statistic calculation unit 144 calculates a statistic using Equation (14) below.

[Equation 14]

$$G^2 = 2N \sum_{x,y,z} P(x, y, z) \log \frac{P(x \mid y, z)}{P(x \mid z)} \quad (14)$$

Instead of the $G^2$ statistic in Equation (14), a $G^2$ statistic in Equation (15) below may be used.

[Equation 15]

$$X^2 = N \sum_{x,y,z} \frac{\{P(x, y \mid z) - P(x \mid z)P(y \mid z)\}^2}{P(x \mid z)P(y \mid z)} \quad (15)$$

$$= N \sum_{x,y,z} \frac{\{P(y, z)(P(x \mid y, z) - P(x \mid z))\}^2}{P(x)P(y)}$$

The maximum likelihood estimation unit 141, the temperature determination unit 142, and the probability function estimation unit 143 estimate a probability function. Since the maximum likelihood estimation unit 141, the temperature determination unit 142, and the probability function estimation unit 143 are the same as the maximum likelihood estimation unit 41, the temperature determination unit 42, and the probability function estimation unit 43 shown in FIG. 1, respectively, the probability function can be estimated by applying the above-described first embodiment or the second embodiment.

A threshold value such as information of 5% of the test is input to the input unit 121, and the threshold value determination unit 145 calculates the $G^2$ statistic in regard to the amount of data and the degree of freedom or a threshold value $X^2_{th}$ of a $\chi^2$ statistic from a $\chi^2$ distribution based on the threshold value. Alternatively, a numerical table of the test may be stored as a database in the storage unit 123 and the threshold value $X^2_{th}$ may be expressed with reference to the numerical table. Based on the calculated $G^2$ statistic or the threshold value $X^2_{th}$ of the $\chi^2$ statistic, the independence determination unit 146 determines whether a conditional independent hypothesis is rejected. The determination result is supplied to the output unit 124 and is output to a process at the rear stage (not shown).

Figure 2:
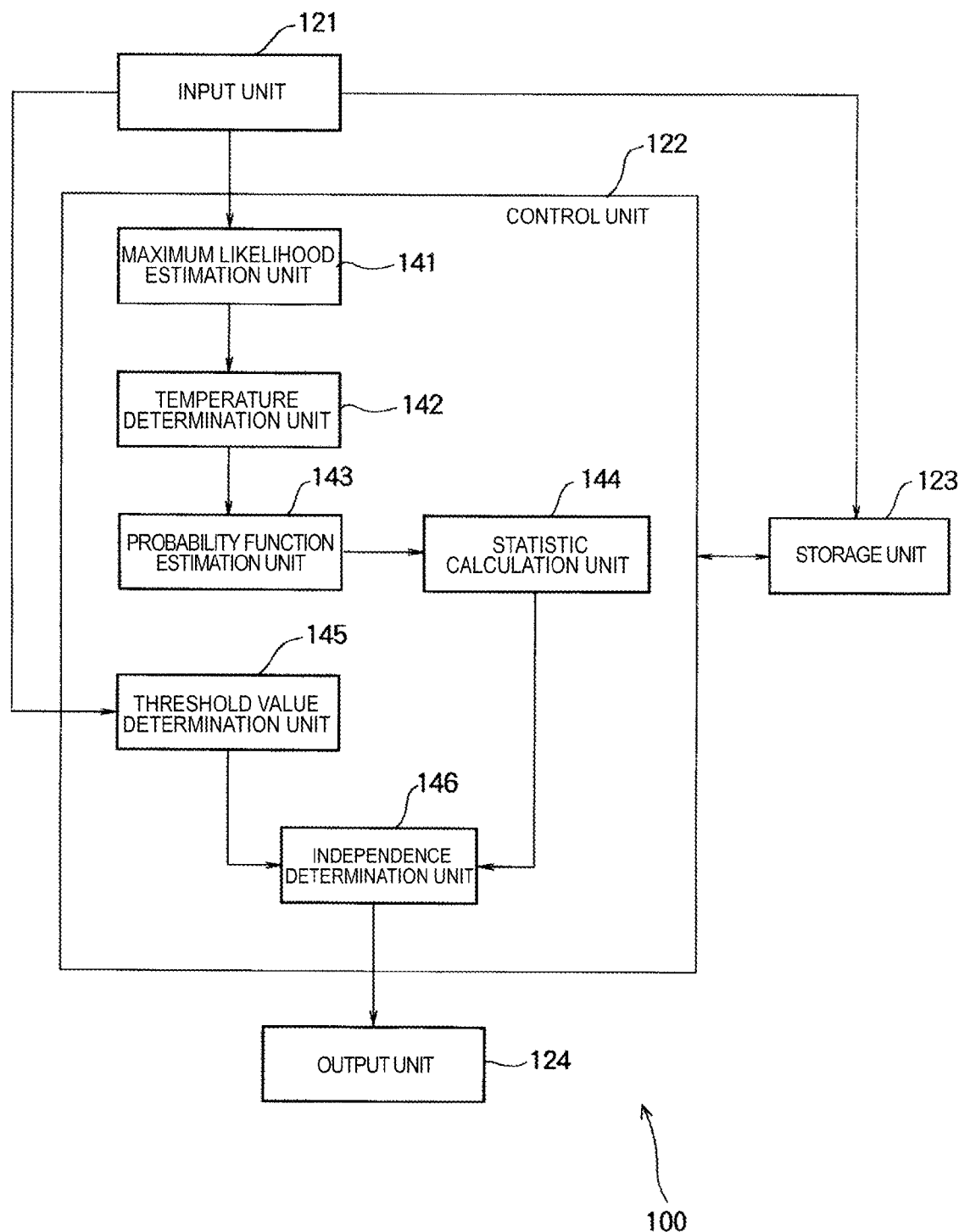
FIG. 2 is a diagram illustrating an information processing apparatus that estimates a probability function according to another embodiment of the present technology.

In the third embodiment, the process is performed by the information processing apparatus 100 shown in FIG. 2. However, the maximum likelihood estimation unit 141, the temperature determination unit 142, and the probability function estimation unit 143 of the control unit 122 of the information processing apparatus 100 have the same configuration as the maximum likelihood estimation unit 41, the temperature determination unit 42, and the probability function estimation unit 43 of the control unit 12 of the information processing apparatus 10 shown in FIG. 1. That is, in the information processing apparatus 100, the unit estimating the probability function has the same configuration in the first or second embodiment. Further, the estimation of the probability function described in the first or second embodiment is also applicable to the third embodiment.

The estimation of the probability function and the test of a statistical hypothesis are applicable to the third embodiment. By performing such a test, the accuracy of the hypothesis test can be improved.

In the information processing apparatus 100 testing the statistical hypothesis according to third embodiment, the statistic calculation unit 144 is configured to perform the calculation using a mutual information amount, a G-squared statistic, and a probability function ratio from the probability function estimated as in the information processing apparatus 10 estimating the probability function described in the first or second embodiment. Thus, it is possible to improve the accuracy of a G-squared test or a likelihood ratio test.

Further, a test may be performed using a chi-squared statistic calculated from the estimated probability function. Thus, it is possible to improve the accuracy of a chi-squared test.

Fourth Embodiment

Next, model selection by the use of entropy will be described according to a fourth embodiment. In the fourth embodiment, an example will be described in which a criterion of selecting a model with the minimum entropy is used as a guideline of the model selection.

Figure 3:
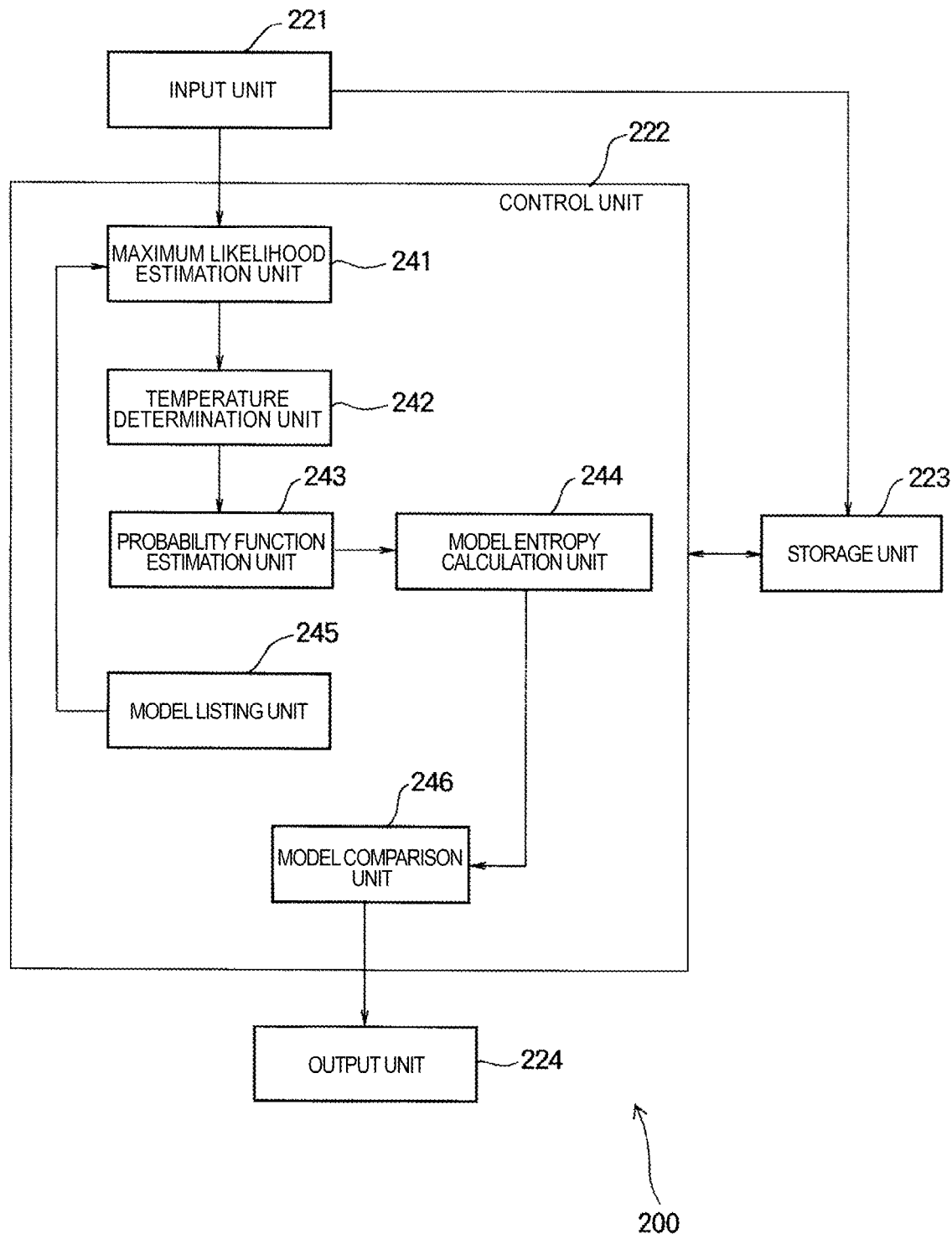
FIG. 3 is a diagram illustrating an information processing apparatus that estimates a probability function according to still another embodiment of the present technology.

An information processing apparatus 200 shown in FIG. 3 includes an input unit 221, a control unit 222, a storage unit 223, and an output unit 224. The control unit 222 includes a maximum likelihood estimation unit 241, a temperature determination unit 242, a probability function estimation unit 243, a model entropy calculation unit 244, a model listing unit 245, and a model comparison unit 246.

A process of the information processing apparatus 200 will be described. The storage unit 223 stores probability variables {X, Y, Z} and also stores three inner states thereof. Further, the storage unit 223 stores ten previous cases for the variables as a database.

An instruction to select an optimum model in a probability distribution expression of {X, Y, Z} is input to the input unit 221. As an expression of a joint probability distribution, a plurality of models such as a distribution in which all of the probabilities are independent from each other, that is, P(X, Y, Z)=P(X)P(Y)P(Z) or a distribution in which some of the probabilities are independent from each other, for example, P(X, Y, Z)=P(X)P(Y|Z)P(Z|X) are considered.

The control unit 222 selects a predetermined model to be processed from the model listing unit 245 and supplies the selected model to the maximum likelihood estimation unit 241. The probability distribution of the model selected from the model listing unit 245 is calculated and all of the probability functions are estimated through the processes of the maximum likelihood estimation unit 241, the temperature determination unit 242, and the probability function estimation unit 243.

Since the maximum likelihood estimation unit 241, the temperature determination unit 242, and the probability function estimation unit 243 are the same as the maximum likelihood estimation unit 41, the temperature determination unit 42, and the probability function estimation unit 43 of the information processing apparatus 10 shown in FIG. 1, respectively, the estimation of the probability function described in the first or second embodiment is also applicable to the fourth embodiment.

Based on the estimated probability function, the model entropy calculation unit 244 calculates, for example, the entropy of a predetermined model. When the predetermined model is P(X, Y, Z)=P(X)P(Y|X)P(Z|X), the entropy of the predetermined model is Equation (16) below.

[Equation 16]

$$H(X, Y, Z) = -\sum_{x,y,z} P(X)P(Y|X)P(Z|X)\log P(X)P(Y|X)P(Z|X) \quad (16)$$

The calculated entropy of the model is stored in the model comparison unit 246. When the entropies of all the models are stored, the model comparison unit 246 selects the model with the minimum entropy and outputs the selection result to the output unit 224. Thus, by estimating the probability function and selecting the model based on the estimated probability function, the accuracy of the model selection can be improved.

The information processing apparatus 200 selecting the model according to the fourth embodiment can select the model with the minimum entropy calculated from the probability function estimated as in the information processing apparatus 10 estimating the probability function described in the first or second embodiment. Thus, it is possible to improve the accuracy of the model selection with reference to the entropy.

An information processing apparatus estimating a multivariate probability can be configured by at least one of the information processing apparatus performing a statistical hypothesis test according to the third embodiment and the information processing apparatus selecting a statistical model according to the fourth embodiment. Such an information processing apparatus is capable of improving the estimation accuracy of a multivariate probability function.

The information processing apparatus estimating the multivariate probability function may be configured as a causal detection apparatus that detects statistical cause and effect. Thus, it is possible to improve the accuracy of the causal detection.

The information processing apparatus estimating the multivariate probability function may be configured as a classifier. Thus, it is possible to improve the accuracy of the classifier.

The information processing apparatus estimating the multivariate probability function may be configured as one of a Bayesian network, a causal Bayesian network, a Markov network, and a Markov logic network. Thus, it is possible to improve the estimation accuracy of the model described above.

Fifth Embodiment

Hereinafter, specific examples to which one of the first to fourth embodiments is applied will be further described. First, a case will be described in which the probability function estimated in the fifth embodiment is applied to a recommendation system.

As the recommendation system, a system recommending books, music, movies, or the like to user can be exemplified. In general, the recommendation system recommends goods or services suitable for the preferences of the user. However, when the recommendation system recommends goods or services, recommended ratings are displayed or instructed in some cases. In the display or the instruction of the recommended ratings, feedback information given by other users having used the goods or the services in the past is used in some cases. A system can be considered in which the number of stars such as a highest rating of five stars and a lowest rating of one star is used as the index of the evaluation in the feedback from the users.

In this case, the recommended ratings of the goods or the services recommended to the user may be an expected value of the evaluation index given as the feedback information from the other users in some cases. For example, four stars are displayed as an expected value as the feedback information from one hundred users or four stars are displayed as an expected value as the feedback information from two users. In both cases, the former feedback information from the one hundred users can be considered to be more reliable than the feedback information from the two users.

However, this difference may not be expressed in a normal expected value. There is no difference even when a dispersion value is displayed. However, when the estimation of the probability function introducing the concept of the temperature is applied, as described above, the fluctuation of the expected value of the former (the feedback information from the one hundred users) decreases (that is, the temperature is lowered) and the fluctuation of the expected value of the latter (the feedback information from the two users) increases (that is, the temperature is raised).

Since the bias of the estimated probability function is corrected due to the difference in the temperature in the latter in which the temperature is high, the number of stars is less than four, and thus the degree increases in the latter more than in the former. When the size of the fluctuation is displayed, users can obtain the rating for which the possibility of the overestimation or underestimation caused due to the small number of data is automatically corrected. Further, the users can see the reliability of the information. Thus, the users can understand the feedback information more accurately, and thus can use the feedback information as decision material. According to the embodiment of the present technology, such decision material can be supplied as suitable information.

Sixth Embodiment

Next, a system will be described which detects a causal relationship between diseases and symptoms using the probability function estimated in the sixth embodiment. Here, {tuberculosis (T), lung cancer (L), bronchitis (B), breast X-ray result (X), dyspnea (D), smoker (S)} are prepared as probability variables. The letters in the parentheses are used below as abbreviations.

The causal relationship between the variables is estimated from data and is further quantified as a conditional probability function. The fact that a test of the conditional independency is effective is known in the estimation of the causal relationship, and thus the probability function is estimated using this test here. The $G^2$ statistic exemplified in the third embodiment can be used as the statistic of the test. The accuracy of the estimation deteriorates when the sets of conditional variables increase. Therefore, the sizes of the sets of conditional variables are evaluated in ascending order. A technology called a PC algorithm is applicable as this method.

Independency is set as a null hypothesis and dependency is set as an alternative hypothesis. Sets of variable, sets of data, and a threshold value of the test are input. When there is dependency in all the pairs of variables and the independency is not rejected, the variables are excluded from the pair of variables. First, a case in which the set of conditional variables is a null set can be examined. That is, the calculation of $G^2=2NI(X;Y)$ in Equation (13) is performed on all of the pairs of variables {X, Y}. When the independent hypothesis is not rejected by the test, it is determined that there is no dependency between the variables X and Y, and thus the variables are excluded from the pair indicating the dependency. When the independent hypothesis is rejected, the variables are not excluded.

Next, when there is one pair of conditional sets (this condition is set to a variable Z), $G^2=2NI(X;Y|Z)$ is calculated. Likewise, when the independent hypothesis is rejected, the variable is excluded from the pair indicating the dependency. When there are two pairs of conditional sets (this condition is set to a pair of variables {Z, W}), $G^2=2NI(X;Y|\{Z,W\})$ is calculated and the test is likewise performed. By repeating this process, the set of pairs for which the dependency is finally rejected for all the conditional sets remains as the pair indicating the dependency. In the pairs, a line without direction is given as in {X-Y}.

A process is performed to change the line with no direction to a line with a direction as in {X →Y} by applying a technology called an orientation rule. When this process is repeated, a network is finally formed in which the variables serve as vertexes and the lines with directions and the lines with no directions are linked to each other. This network is output as a causal network. For example, a causal network of {S-C}, {S-B}, {C→D}, {B→D}, {C→X}, and {T→X} is formed and output.

Further, the causal relationship can be expressed as a statistical relation. Since the lines with no directions in the network are statistically unrecognizable cause and effect, the users can designate the direction with the background knowledge of the variables. For example, the user designates {S-C} to {S→C}. Further, the user designate {S-C} to {C→S} to specify the cause and effect of {S-C}. Thus, since all the lines are changed to the lines with directions, all relations are expressed as the Bayesian network.

By using the processes described above, a pair of variables called a master can be determined for each variable. For example, a pair of variables for which {B, C} is called a master is determined for a variable D. A pair of variables for which {C, T} is called a master is determined for a variable X. A condition probability function is estimated under the condition that the masters are determined for all of the variables. When there is no master, the probability function becomes a general probability function. All of the probability functions are estimated based on the sets of data as in the first or second embodiment. Thus, all of the (conditional) probability functions are estimated and output together with a network structure.

Seventh Embodiment

Next, a document classification system will be described as an application of using the probability function estimated in the sixth embodiment. The document classification system is called a supervised learning system. Therefore, the system includes a learning unit and an estimation unit. The embodiment of the present technology is applicable to the learning unit of the system.

M sets of text documents and category classification results are input into the learning unit. The input text documents are segmented into words by morphological analysis. The words are stored as probability variables of a classifier. It is assumed that the probability variable of the word has two states to determine whether the words occur in each document. Alternatively, a category may be generated in advance in accordance with the number of occurrences. Here, the former is assumed.

Then, a document classification category can also serve as the probability variable, and thus a dependency of the probability variable between the document classification category and each word can be examined. A word having a weak dependent relation between the document classification category and the word can be examined using a mutual information amount or the like and can be deleted as the variable in advance. Since there is a correlation between the words, the correlation can be expressed as a Bayesian network to generate a document classifier with high accuracy. The network structure of the Bayesian network can be learned by selection of a statistical model. The network structure of the Bayesian network can be learned through the selection of the entropy minimization model described in the fourth embodiment.

The pairs of probability variables generated from N words, two states thereof, and m sets of data regarding the occurrence state of each document of each variable are input. The network structure with the minimum entropy can be estimated by calculating the entropy of each model as described in the fourth embodiment.

When there are too many combinations, the variables are reduced in advance. Alternatively, a method called a greedy algorithm, a method of restricting the complication of the dependency, or the like may be used. By performing the process, the network structure with the optimum output can be realized. A pair of a variable X and a set of variables as conditions (here, three variables {Y, Z, W} are used as examples) is given as an output. The pair of the variable X and the set of variables is expressed as {X|Y, Z, W}.

Next, the learning unit calculates all of the conditional probabilities in the set network structure. As inputs, a pair {Y, Z, W, $X_c$} formed by adding a document classification variable $X_c$ to a pair of condition sets {Y, Z, W} determined in the network is given for the variable X of all the words together with the set of data, which is expressed as Condition(X). In the seventh embodiment, a conditional probability function P(X|Condition(X)) can be estimated as in the first or second embodiment.

The conditional probability function of all the word variables is given as an output. A conditional probability function P(X|Condition($X_i$)) for each word variable $X_i$ and a probability function P($X_C$) are calculated. Then, the learning of the learning unit is ended and each output is stored in the storage unit.

In the estimation unit, text document data desired to be newly classified is given as an input. The text document is segmented into words by morphological analysis. The value of a corresponding conditional probability function is extracted from information regarding occurrence of the words in a new text document with reference to the conditional probability function of all the word probability variables stored in the storage unit. When the value is called a conditional probability value, the conditional probability function indicating the category to which the document input by the conditional probability value is classified is calculated as in Equation (17) below.

[Equation 17]

$$P(Xc \mid \{e\})P(Xc)\prod_i P(Xi = ei \mid \{\text{Condition}(Xi) \setminus Xc\} = \{E\}, Xc) \quad (17)$$

In Equation (17), {e} indicates a pair of word variables since the states of all the word variables are determined. Further, $X_i=e_i$ in the right side indicates that the state of the variable word $X_i$ is $e_i$.

$$\{\text{Condition}(X) \setminus X_c\} = \{E\} \quad [\text{Equation 18}]$$

The equation indicates that the state of the pair of variables of Condition(X) is {E} excluding the document classification variable. As a result, a document may be input into a category with the highest probability value. Accordingly, the category with the highest probability value is suggested as an output.

The embodiments of the present technology are applicable to an apparatus performing a process using a probability function and the examples described here are merely examples and the present technology is not limited thereto.

According to the embodiments, the probability function in which the bias dependent on the amount of data is corrected can be estimated. Further, since there is no parameter adjusted for each set of data by the user, the accuracy in the small amount of data and loss calculation cost can be compatible.

Recording Medium

The above-described series of processes may be executed by hardware or software. When the series of processes are performed by software, a program for the software is installed in a general computer or the like. Here, examples of the computer include a dedicated-hardware embedded computer and a general personal computer capable of executing various functions by installing various programs.

Figure 4:
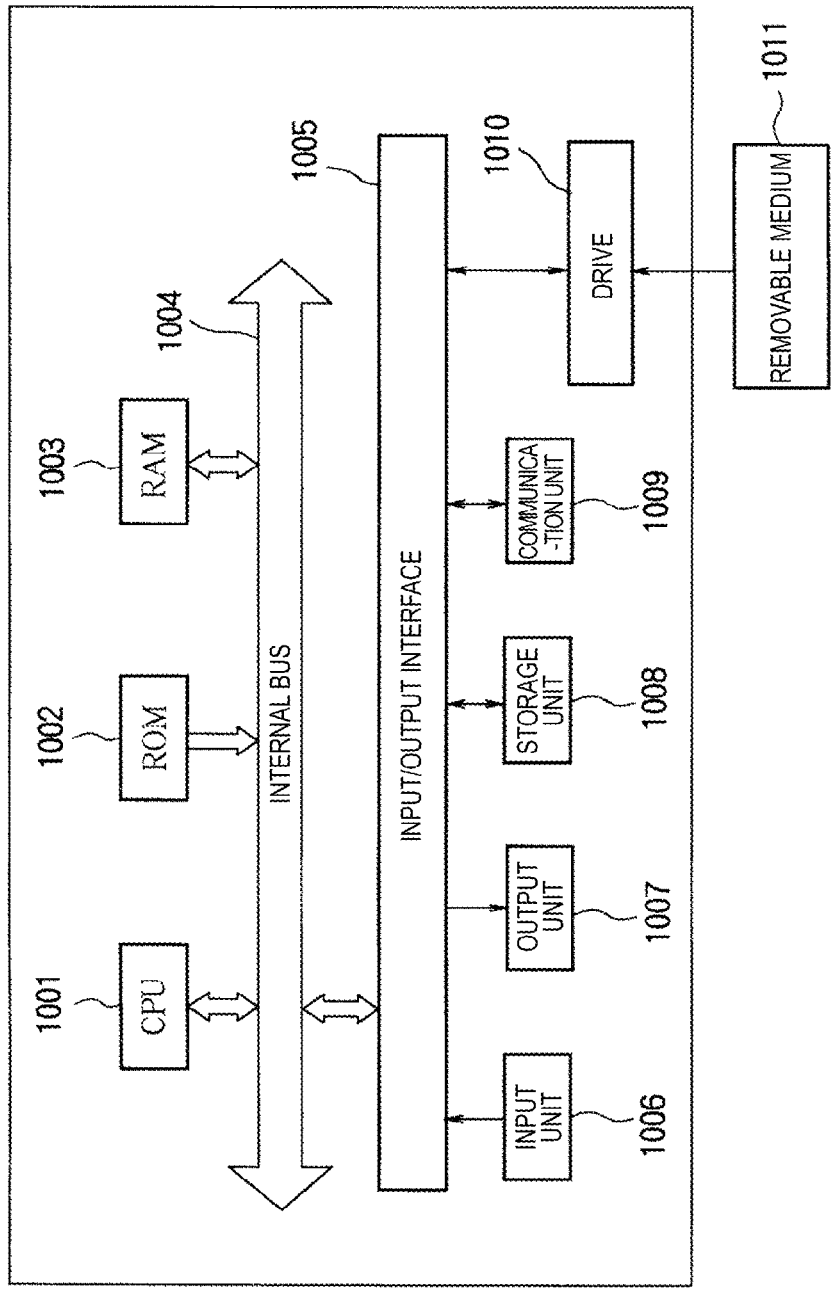
FIG. 4 is a diagram illustrating a recording medium.

FIG. 4 is a block diagram illustrating a configuration example of the hardware of a computer executing the above-described series of processes by a program. In the computer, a central processing unit (CPU) 1001, a read-only memory (ROM) 1002, and a random access memory (RAM) 1003 are connected to each other via a bus 1004. Further, an input/output interface 1005 is connected to the bus 1004. An input unit 1006, an output unit 1007, a storage unit 1008, a communication unit 1009, and a drive 1010 are connected to the input/output interface 1005.

The input unit 1006 is configured by a keyboard, a mouse, a microphone, or the like. The output unit 1007 is configured by a display, a speaker, or the like. The storage unit 1008 is configured by a hard disk, a non-volatile memory, or the like. The communication unit 1009 is configured by a network interface or the like. The drive 1010 drives the removable medium 1011 such as a magnetic disk, an optical disc, a magneto-optical disc, or a semiconductor memory.

In the computer with the above-described configuration, the CPU 1001 executes the above-described series of processes, for example, by loading and executing the program stored in the storage unit 1008 on the RAM 1003 via the input/output interface 1005 and the bus 1004.

For example, the program executed by the computer (the CPU 1001) can be recorded in the removable medium 1011 as a package medium for supply. Further, the program can be supplied via a wired or wireless transmission medium such as a local area network, the Internet, or digital satellite broadcast.

In the computer, the program can be installed on the storage unit 1008 via the input/output interface 1005 by mounting the removable medium 1011 on the drive 1010. Further, the program can be received by the communication unit 1009 via a wired or wireless transmission medium and can be installed on the storage unit 1008. Further, the program can be installed in advance on the ROM 1002 or the storage unit 1008.

The program executed by the computer may be a program processed chronologically in the order described in the specification or a program processed in parallel or at a necessary timing when called.

In the specification, the system indicates the entire apparatus including a plurality of apparatuses.

Embodiments of the present technology are not limited to the above-described embodiments, but may be modified in various forms without departing from the gist of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a memory configured to have computer readable program stored thereon; and
   a central processing unit (CPU) arranged to receive the program from the memory and upon execution thereof to operate as
   (i) a first calculation unit that calculates a probability function with highest likelihood based on data, (ii) a second calculation unit that calculates a canonical distribution in statistical physics and a parameter of the canonical distribution as a fluctuation of the data, and (iii) an estimation unit that estimates a probability function using the probability function with the highest likelihood calculated by the first calculation unit, the fluctuation calculated by the second calculation unit, and the canonical distribution,
   wherein when the second calculation unit calculates the fluctuation of the data, n data items are used, and Kullback-Leibler information is calculated by the probability function calculated based on (n-1) data items by the estimation unit and one of a probability function with the highest likelihood calculated based on the n data items, a Bayesian posterior probability function, and an empirical distribution function.

2. The information processing apparatus according to claim 1, wherein the first calculation unit calculates an empirical distribution function.

3. The information processing apparatus according to claim 1, wherein the probability function with the highest likelihood is substituted with a Bayesian posterior probability function.

4. The information processing apparatus according to claim 1, wherein the probability function calculated based on the (n-1) data items is substituted with a geometric mean of the probability function calculated likewise based on up to j (where $0 \leq j \leq n-1$) data items.

5. The information processing apparatus according to claim 1, wherein one of the probability function with the highest likelihood calculated based on the n data items, the Bayesian posterior probability function, and the empirical distribution function is substituted with a geometric mean of one of a probability function having the highest likelihood calculated likewise based on up to j (where $0 \leq j \leq n-1$) data items, the Bayesian posterior probability function, and the empirical distribution function.

6. The information processing apparatus according to claim 1, wherein the probability function is estimated by the use of recursive calculation performed using the canonical distribution and the fluctuation of the data calculated by substitution of the probability function calculated based on (n-1) data items by a probability function calculated based on n data items.

7. The information processing apparatus according to claim 1, wherein a statistical hypothesis test is performed using the probability function estimated by the estimation unit.

8. The information processing apparatus according to claim 7, wherein one of a mutual information amount, a G-squared statistic, and a probability function ratio calculated from the probability function estimated by the estimation unit is used.

9. The information processing apparatus according to claim 1, wherein a statistical model is selected using the probability function estimated by the estimation unit.

10. The information processing apparatus according to claim 1, wherein the probability function estimated by the estimation unit is a multivariate joint probability function or a conditional probability function.

11. The information processing apparatus according to claim 10, wherein the information processing apparatus is a causal detection apparatus detecting statistical cause and effect or a classifier.

12. The information processing apparatus according to claim 10, wherein the multivariate probability function is one of a Bayesian network, a causal Bayesian network, a Markov network, and a Markov logic network.

13. The information processing apparatus according to claim 1, further comprising an output device, and wherein during execution of the program the CPU further operates to obtain desired information regarding a recommendation or a relationship between desired parameters by the estimated probability function and to cause the desired information to be provided to the output device to enable a user to obtain the desired information.

14. An information processing apparatus comprising:
    a memory configured to have computer readable program stored thereon; and
    a central processing unit (CPU) arranged to receive the program from the memory and upon execution thereof to operate as
    (i) a first calculation unit that calculates a probability function with highest likelihood based on data, (ii) a second calculation unit that calculates a canonical distribution in statistical physics and a parameter of the canonical distribution as a fluctuation of the data, and (iii) an estimation unit that estimates a probability function using the probability function with the highest likelihood calculated by the first calculation unit, the fluctuation calculated by the second calculation unit, and the canonical distribution,
    wherein a statistical hypothesis test is performed using the probability function estimated by the estimation unit, and
    wherein a chi-squared statistic calculated from the probability function estimated by the estimation unit is used.

15. An information processing apparatus comprising:
    a memory configured to have computer readable program stored thereon; and
    a central processing unit (CPU) arranged to receive the program from the memory and upon execution thereof to operate as
    (i) a first calculation unit that calculates a probability function with highest likelihood based on data, (ii) a second calculation unit that calculates a canonical distribution in statistical physics and a parameter of the canonical distribution as a fluctuation of the data, and (iii) an estimation unit that estimates a probability function using the probability function with the highest likelihood calculated by the first calculation unit, the fluctuation calculated by the second calculation unit, and the canonical distribution, wherein a statistical model is selected using the probability function estimated by the estimation unit, and wherein a model with least entropy calculated from the probability function estimated by the estimation unit is selected.

16. An information processing method comprising:

calculating a probability function with highest likelihood based on data;

calculating a canonical distribution in statistical physics and a parameter of the canonical distribution as a fluctuation of the data; and estimating, by use of a central processing unit (CPU) a probability function using the probability function with the highest likelihood, the fluctuation of the data, and the canonical distribution, wherein when calculating the fluctuation of the data, n data items are used, and Kullback-Leibler information is calculated by the probability function calculated based on (n-1) data items by the CPU and one of a probability function with the highest likelihood calculated based on the n data items, a Bayesian posterior probability function, and an empirical distribution function.

17. A non-transitory computer readable medium having stored thereon a program for causing a computer to execute a process that includes:

calculating a probability function with highest likelihood based on data;

calculating a canonical distribution in statistical physics and a parameter of the canonical distribution as a fluctuation of the data; and estimating a probability function using the probability function with the highest likelihood, the fluctuation of the data, and the canonical distribution, wherein when calculating the fluctuation of the data, n data items are used, and Kullback-Leibler information is calculated by the probability function calculated based on (n-1) data items by the estimating and one of a probability function with the highest likelihood calculated based on the n data items, a Bayesian posterior probability function, and an empirical distribution function.

* * * * *